(12) United States Patent
Bagwell (10) Patent No.: US 8,527,736 B1
(45) Date of Patent: Sep. 3, 2013

(54) SYSTEMS AND METHODS FOR IMPROVING ADDRESS TRANSLATION SPEED

(75) Inventor: Coleman Bagwell, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 214 days.

(21) Appl. No.: 12/876,844

(22) Filed: Sep. 7, 2010

(51) Int. Cl.
*G06F 12/00* (2006.01)
*G06F 9/26* (2006.01)
*G06F 9/34* (2006.01)

(52) U.S. Cl.
USPC .......................................... 711/207; 711/206

(58) Field of Classification Search
USPC .................................. 711/206–207
See application file for complete search history.

(56) References Cited

U.S. PATENT DOCUMENTS

| | | | | |
|---|---|---|---|---|
| 6,112,285 | A * | 8/2000 | Ganapathy et al. | 711/207 |
| 6,374,341 | B1 * | 4/2002 | Nijhawan et al. | 711/207 |
| 7,003,647 | B2 * | 2/2006 | Jacobs et al. | 711/207 |
| 7,366,869 | B2 * | 4/2008 | Sartorius et al. | 711/207 |
| 7,711,903 | B2 | 5/2010 | Day et al. | |
| 8,195,917 | B2 * | 6/2012 | Hohmuth et al. | 711/207 |
| 2004/0117594 | A1 | 6/2004 | VanderSpek | |
| 2006/0277390 | A1 | 12/2006 | Zuraski et al. | |
| 2008/0307187 | A1 | 12/2008 | Schopp | |
| 2009/0254728 | A1 | 10/2009 | Kamensky et al. | |
| 2011/0173411 | A1 * | 7/2011 | Chen et al. | 711/207 |

OTHER PUBLICATIONS

Madhusudhan Talluri, Mark D. Hill, Surpassing the TLB Performance of Superpages with Less Operating System Support, Oct. 1994, Computer Sciences Department, University of Wisconsin, p. 2.*

* cited by examiner

*Primary Examiner* — Matthew Bradley
*Assistant Examiner* — Rocio Del Mar Perez-Velez
(74) *Attorney, Agent, or Firm* — Maynard Cooper & Gale, P.C.; Jon E. Holland (57) ABSTRACT

A computer system has a translation lookaside buffer (TLB) having a plurality of entries for mapping virtual memory addresses to physical memory addresses and logic configured to perform the following steps for an entry of the TLB: (a) selecting a TLB entry size for the entry; (b) determining whether a mapping for the entry is aligned with a boundary of a contiguous section of memory without overshooting an end of the contiguous section of memory, wherein the mapping is based on the TLB entry size and maps virtual memory addresses to physical memory addresses for a section of the memory consistent with the TLB entry size; (c) if the mapping is determined to be aligned with the boundary of the contiguous section of memory without overshooting the end of the contiguous section of memory, configuring the entry with the mapping written into the entry; and (d) repeating steps (a) through (c) until a mapping is found to be aligned with the boundary of the contiguous section of memory without overshooting the end of the contiguous section of memory, wherein the logic is configured to repeat steps (a) through (d) until the contiguous section of memory is entirely mapped to virtual addresses by entries of the TLB.

11 Claims, 7 Drawing Sheets

SYSTEMS AND METHODS FOR IMPROVING ADDRESS TRANSLATION SPEED

BACKGROUND

A typical computer may have, for example, 32 or 64 megabytes (MB) of random access memory (RAM) that is available for use by the central processing unit (CPU). When a computer is powered on, the CPU loads the operating system (OS) into RAM. Further, when a user runs an application or multiple applications, the CPU loads the applications into RAM. Thus, 32 or 64 MB of RAM may not be enough to run the OS and all of the programs that users may desire to run at a given time.

Typically, virtual memory is used by the OS in order to address the issue that the RAM is not sufficiently large enough to run the OS and various applications simultaneously. Virtual memory is a technique used by the OS that allows the computer to "see" more main memory (e.g., RAM) than it actually has. It does this by using portions of the hard disk to simulate the RAM. In this regard, the accessible memory appears to be a contiguous memory section, while in reality the accessible memory may be physically fragmented and overflow to the hard disk. Such virtual memory is addressable by virtual memory addresses that are mapped to the physical memory addresses of that portion in memory where the content is stored.

Accordingly, during operation there exists a need to translate a virtual memory address requested by an application into a physical memory address. This is often done by a page table, which is a table stored in RAM that comprises virtual address keys corresponding to a plurality of physical addresses.

In addition, most CPUs employ a translation lookaside buffer (TLB), which is a type of cache memory that maps virtual addresses to physical addresses. For a "hardware walked" TLB, during operation a memory management unit (MMU) may use the page table or the TLB to translate a virtual address to a physical address. In a "software walked" TLB, the MMU only uses the entries in the TLB to translate a virtual address to a physical address. Using the TLB to perform such translation tends to speed up the process of virtual-to-physical address translation because the TLB is typically on-processor cache.

As indicated, the TLB is a table that maps virtual addresses to physical addresses. In this regard, software running on the CPU may present a virtual address to the MMU. The MMU searches the TLB for the virtual address and locates the virtual address in the TLB table. The MMU then retrieves the physical address mapped to the virtual address, if the virtual address search is located in the TLB. When the virtual address is found in the TLB, this is referred to as a "TLB hit." If the virtual address is not found in the TLB, this is referred to as a "TLB miss."

If a TLB miss occurs, in a "hardware walked" implementation, the MMU then looks up the virtual address in the page table. This is often referred to as a "page walk," and such process tends to require more time to accomplish because the page table is stored in main memory as opposed to cache like the TLB table.

In a "software walked" implementation, if there is no entry in the TLB that matches the virtual address, a TLB miss exception is raised by the MMU with the CPU. The CPU core executes TLB miss exception handler code that is resident on the CPU to find the correct entry in the page table that is then placed into the TLB to handle the virtual address that is being translated.

Upon returning from the TLB miss exception handler code for a "software walked" implementation or from the page table lookup for a "hardware walked" implementation, the correct virtual-to-physical mapping is inserted as an entry into the TLB for the present access and any future access by the CPU. Such entry into the TLB may specify a cache coherency scheme, a valid bit, and a global bit. The global bit indicates whether the entry into the TLB is static, i.e., cannot be removed, or is dynamic, can be replaced in response to a TLB miss.

The MMU then retries the translation of the virtual to a physical address using the entries in the TLB. In this regard, because the TLB has been updated with a new TLB entry, the translation for the virtual address presented will not fail and access to physical memory will be complete.

DESCRIPTION OF DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the figures.

DESCRIPTION

Figure 1:
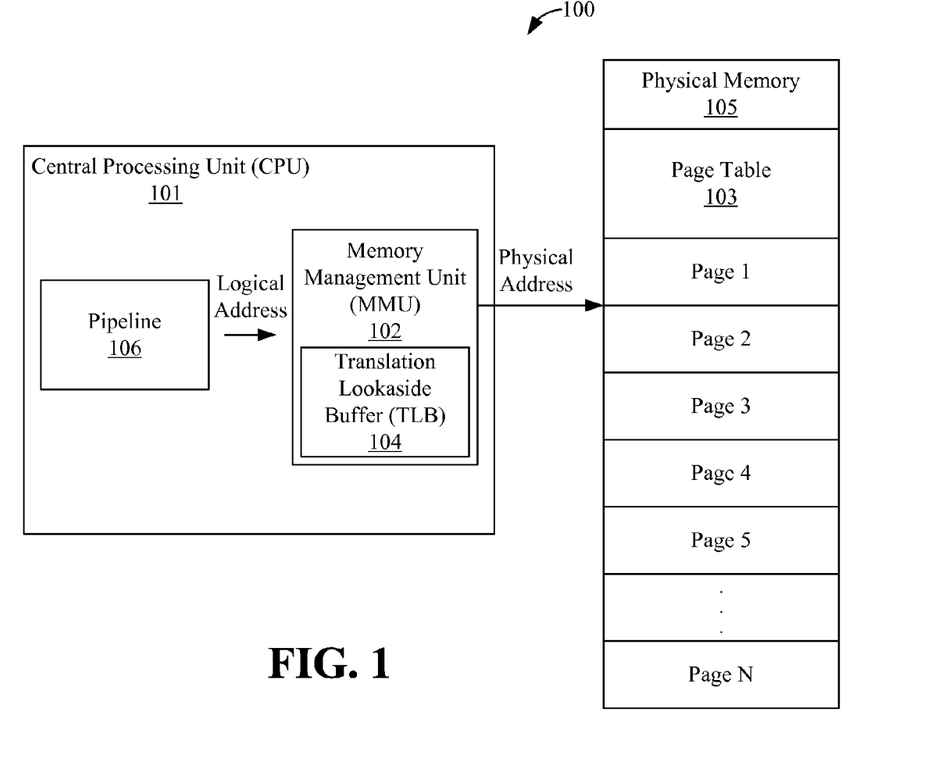
FIG. 1 is a block diagram of an exemplary system for improving address translation speed in accordance with an embodiment of the present disclosure.

FIG. 1 is a block diagram depicting an exemplary embodiment of a system 100 for improving address translation speed. The system 100 comprises a central processing unit (CPU) 101 that comprises at least one pipeline 106 that is communicatively coupled to a memory management unit (MMU) 102. In the embodiment shown in FIG. 1, the MMU 102 is physically on the CPU 101. That is, the MMU 102 resides on the same board as the pipeline 106. However, in other embodiments, the MMU 102 may be separate and apart from the CPU 101.

The system 100 further comprises a translation lookaside buffer (TLB) 104. The TLB 104 is communicatively coupled to the MMU 102. Note that in one embodiment, the TLB 104 is physically part of the MMU 102.

In addition, the system 100 further comprises physical memory 105. The physical memory 105 may include random access memory (RAM), flash memory, or hard disk. The physical memory 105 comprises a page table 103. In addition, the physical memory 105 is demarcated into a plurality of pages (page 1-page N), where each page can be accessed with a corresponding physical address.

During operation, the MMU 102 stores a cache of recently used mappings from the operating system's page table 103 in the TLB 104. The pipeline 106 presents a virtual address to the MMU 102 that an application running on the CPU 101 needs to continue operation. Accordingly, the MMU 102 translates the virtual address received into a physical address. In this regard, when a virtual address needs to be translated into a physical address, the MMU 101 first searches the TLB 104.

If a match is found, referred to as a "TLB hit," the MMU 102 returns the physical address stored correlating to the virtual address to the pipeline 106 so that the application can continue running. Thus, memory access by the application can continue.

However, if there is no match in a "hardware walked" implementation, referred to as a "TLB miss," the MMU 102 looks up the virtual address in the page table 103. This is referred to as a "page walk." If the virtual address is found in the page table 103, the MMU 102 writes the virtual address/physical address pair to the TLB table 103. In a "software walked" implementation, the MMU raises the TLB miss exception to the CPU core, and the CPU then locates the correct translation in the page table. The CPU updates the TLB table 103 with the located virtual-to-physical mapping.

Then the MMU retries the address translation using the newly updated TLB entries. Because the TLB table 103 is updated, the MMU access of the TLB table 103 with the virtual address is a TLB hit. Furthermore, thereafter when the virtual address is requested by the pipeline 106, there will be a subsequent TLB hit. Once a TLB hit has occurred, the physical address obtained in the translation can then be used to access the physical memory 105.

The afore described process works in the context of a CPU 101 and an operating system (OS) where virtual memory has been implemented. Virtual memory appears to the CPU 101 to be a contiguous set of memory pages, even though it may be fragmented and even though it may not exist in RAM.

Figure 2:
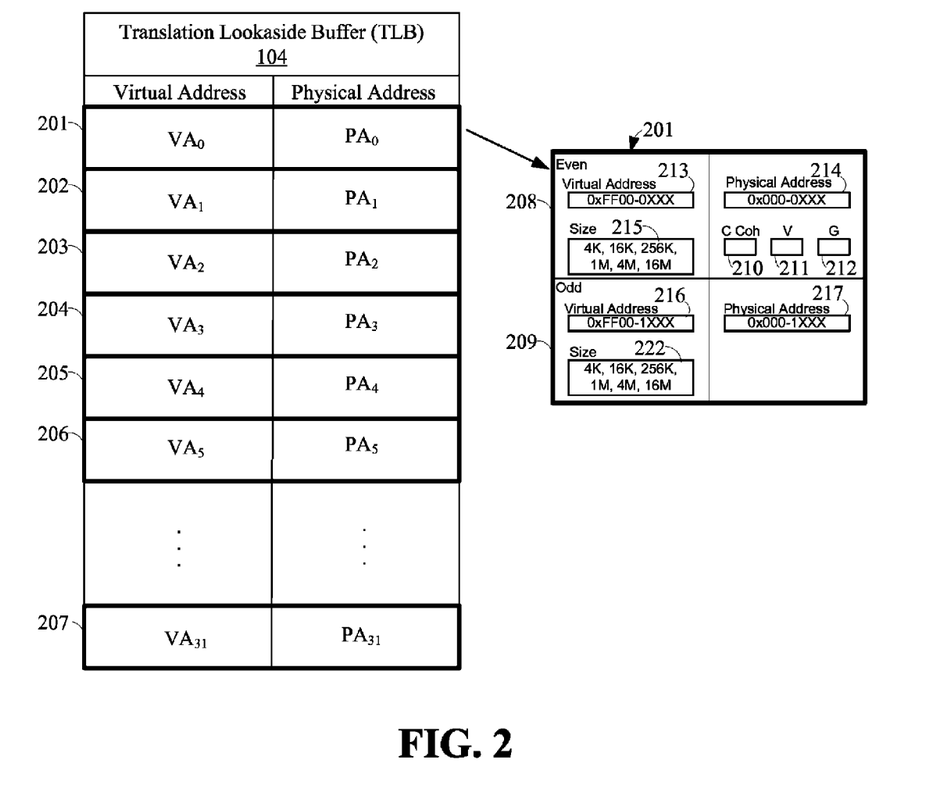
FIG. 2 is a block diagram of an exemplary translation lookaside buffer (TLB) as used in the system such as is depicted in FIG. 1.

A more detailed depiction of the TLB 104 is shown in FIG. 2. The TLB 104 is a table of virtual address/physical address mappings. In this regard, the TLB 104 comprises a plurality of entries 201-207 having virtual addresses ($V_0$-$V_n$)/physical address ($P_0$-$P_n$) mappings. Note that the TLB table 104 is shown having thirty-two entries. However, other numbers of entries are possible in other embodiments of the TLB 104. In the embodiment shown, only thirty-two entries can be placed in the TLB 104 at one time.

Each entry is substantially similar in format, and one such entry 201 is described in more detail hereafter for brevity. Note, however, that such description of entry 201 applies to the other entries 202-207 in the TLB 104.

In one embodiment, the TLB entry 201 is divided into an even page 208 and an odd page 209. The even page 208 covers even virtual addresses. Whereas, the odd page 209 covers odd virtual addresses. However, other TLB architectures are possible in other embodiments.

The even page comprises an even beginning virtual address 213 and a corresponding beginning physical address 214. As an example, the virtual address 213 is the even address "0xFF-0XXX," where the "0" indicates even. The odd page comprises an odd beginning virtual address 216 and a corresponding beginning physical address 217. As an example, the virtual address 216 is the odd address "0xFF-1XXX," where the "1" indicates odd.

Further, the TLB entry 201 has a cache coherency bits 210, which can be set. The cache coherency bit 210 indicates whether the values that are stored at the physical memory location corresponding to the physical address can be stored in cache or not. In other words, is it acceptable for the MMU 102 to cache the information located at the physical memory locations.

Further, the TLB entry 201 has a valid bit 211, which can be set. The valid bit 211 indicates whether the TLB entry 201 is still valid. The MMU 102 can use the valid bit 211 to know whether the information contained in the TLB entry can still be used to perform a virtual-to-physical translation.

Further, the TLB entry has a global bit 212, which can be set. The global bit 212 indicates whether an entry is able to be over written by the MMU 102 (FIG. 1) during a TLB miss exception. For example, if the global bit 212 is set, this indicates that the information contained in the TLB entry 201 must always be in TLB entry 201, and the MMU 102 cannot overwrite the TLB entry 201 through normal operation of the TLB miss exception. Thus, a TLB entry 201 can be considered static, i.e., once it is in the TLB table 104, it will not be overwritten by the MMU 102 during a TLB miss exception.

Further, the even page 208 and the odd page 209 comprise size indicators 215 and 222, respectively. The size indicators can vary in size, for example, the size may be 4 kilobytes (KB), 16 KB, 256 KB, 1 Megabyte (MB), 4 MB, or 16 MB. The size indicator indicates the size of the memory that is mapped by the TLB entry 201. For example, if the physical address 214 is "0x0000-0000" and the size indicator 216 indicates a size of 4 KB, then the physical memory that is mapped by the virtual address 213 is 0x0000-0000 through 0x00001000.

Some CPU architectures only allow TLB entries to map certain sizes of physical memory. In the example provided, there is a range of sizes of physical memory that can be mapped by the even page, including 4 KB, 16 KB, 256 KB, 1 MB, 4 MB, and 16 MB, and there is a range of sizes of physical memory that can be mapped by the odd page, including 4 KB, 16 KB, 256 KB, 1 MB, 4 MB, and 16 MB. In this regard, the smallest amount of physical memory that can be mapped by a TLB entry to a virtual address is 8 KB (i.e., two times 4 KB), while the largest amount of physical memory that can be mapped to a virtual address is 32 MB (i.e., two times 16 MB). In one embodiment, the size for the even page matches the size for the odd page for a given TLB entry.

Figure 3:
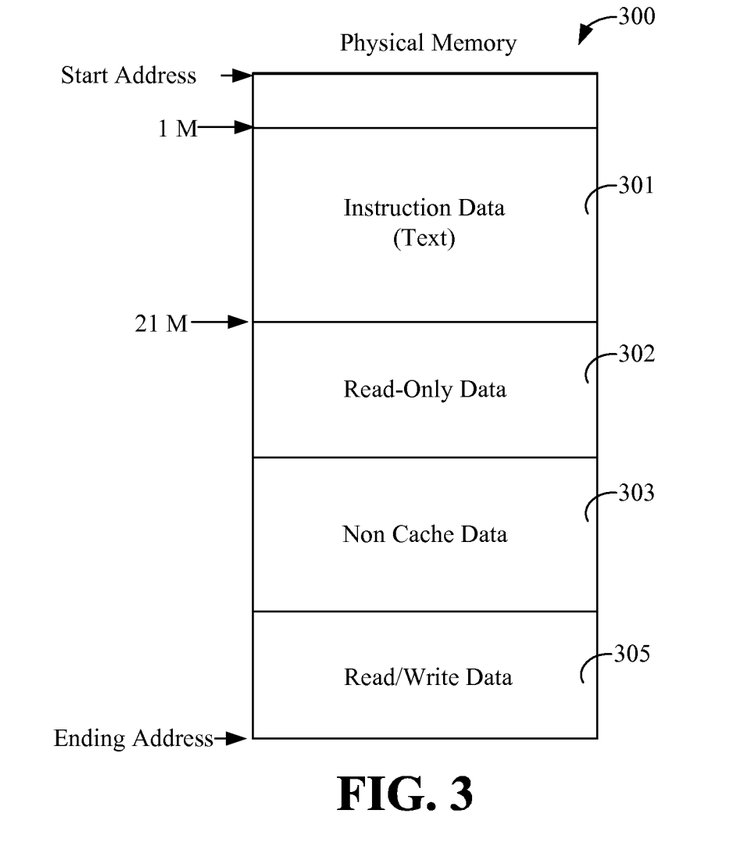
FIG. 3 is a block diagram of a section of physical memory such as is depicted in FIG. 1.

FIG. 3 depicts an exemplary section 300 of physical memory (e.g., RAM) showing the different sections 301-305 contained in the physical memory when a program is executed. In this regard, a developer writes a program in a human-readable source code. A compiler then converts the human-readable source code into object code. A linker then links the object code to generate an executable program.

When the executable program is executed, the memory section 300 is mapped having the different sections as shown. In this regard, instruction data, read-only data, non-cache data, and read/write data are loaded into the memory section 300.

In the example provided, when the program is executed, the instruction data section 301 is approximately 20 MB starting at 1 MB and continuing to 21 MB. The read-only data section 302, the non-cache data section 303, and the read/write data section 305 takes up approximately 107 MB. Thus, the physical memory is partitioned up into these different sections.

In accordance with an embodiment of the present disclosure, the instruction data section 301 comprises machine instructions embodying an algorithm for efficiently allocating a contiguous section of physical memory among the entries of a TLB.

Notably, for each section in physical memory, the start address and the ending address for the section are known when the executable is created. Such data describing the start address and the ending address for the section is part of the instruction data in the instruction data section 301 and is generated by the compiler and linker when the source code is translated to an executable.

Further note that, as described hereinabove, the TLB entry only maps a certain size of physical memory. In the exemplary TLB entry in FIG. 2, the smallest physical memory that can be mapped is 8 KB and the largest physical memory that can be mapped is 32 MB. However, a section, e.g., the instruction data section 301, may be larger than the largest TLB entry size, e.g., 32 MB.

The algorithm of the present disclosure generates TLB entries on a per section basis. For example, the algorithm may generate TLB entries for the instruction data section 301 of the physical memory 300.

Beginning with the start address of the physical memory section, e.g., the instruction data section 301, the algorithm finds the largest TLB entry size capable of maintaining alignment between the TLB entry and the memory section 301 such that each physical address mapped by the entry (beginning with the start address) is in the memory section 301. Failing to align the TLB entry with the memory section of interest may waste memory.

Note that memory alignment means putting the data at a memory offset equal to some multiple of the required alignment size. Thus, for the first TLB entry, the physical address being mapped by the entry must be some integer multiple of the TLB size selected.

Figure 4:
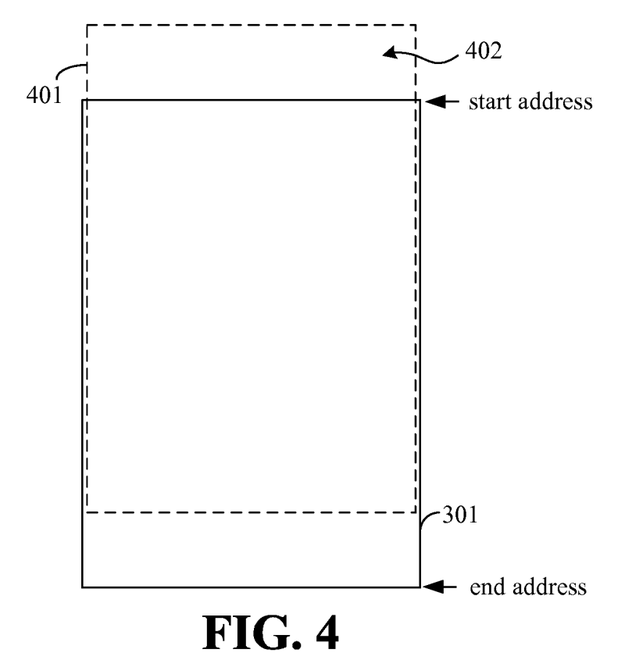
FIG. 4 is a chunk of the memory such as is depicted in FIG. 3 showing misalignment of a TLB mapping.

As an example, FIG. 4 depicts the contiguous physical memory section 301 to be mapped by TLB entries. The dotted line 401 represents an area of memory that might be covered by a TLB entry of a certain size. As shown by FIG. 4, the area of memory associated with the TLB entry is not aligned with the physical memory 301 since a portion 402 of the memory mapped by the TLB entry is outside of the physical memory section 301. Such memory portion 402 is wasted.

Figure 5:
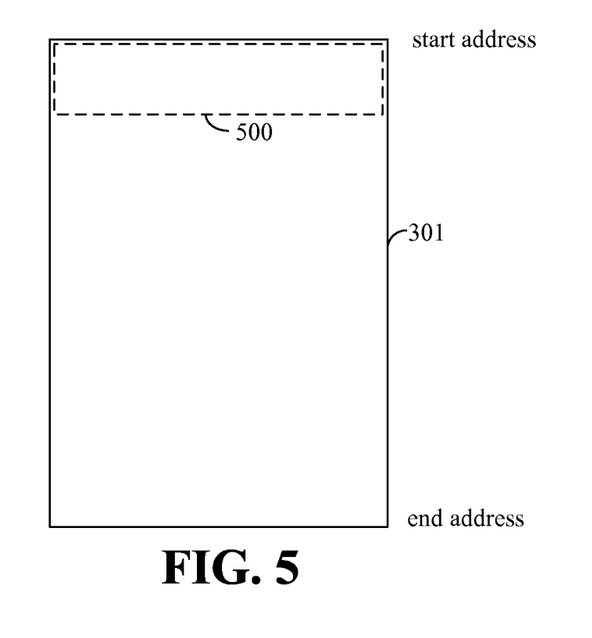
FIG. 5 is the chunk of the memory such as is depicted in FIG. 4 showing alignment of a TLB mapping.

By selecting the size of the TLB entry to cover a smaller portion of physical memory, it is possible to align the boundary of the TLB entry with the start address of the physical memory section 301. As shown in FIG. 5, the dotted line 500 covers a smaller portion of physical memory, but it now aligned with the physical memory section 301. Note that selecting a larger size of the TLB entry reduces the total number of TLB entries required to map the section 301 since a TLB entry of a larger size maps a larger number of memory addresses. However, as noted above, selecting the size of the TLB entry to be too large prevents alignment between the TLB entry and the memory section 301 resulting in wasted memory space.

Figure 6:
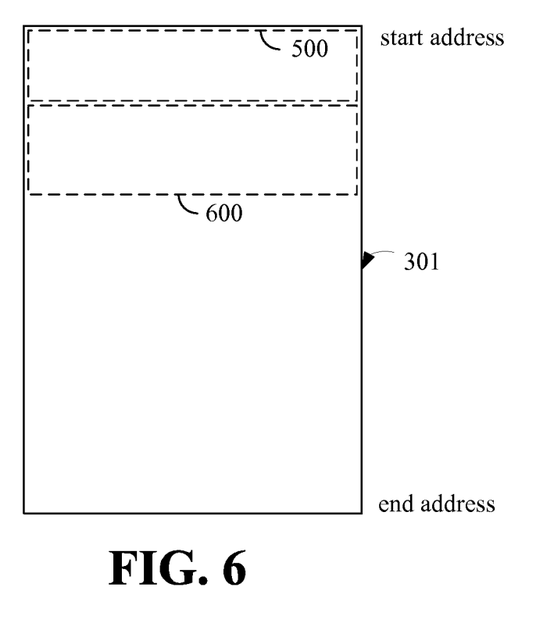
FIG. 6 is the chunk of the memory such as is depicted in FIG. 4 showing two contiguous TLB mappings.
Figure 7:
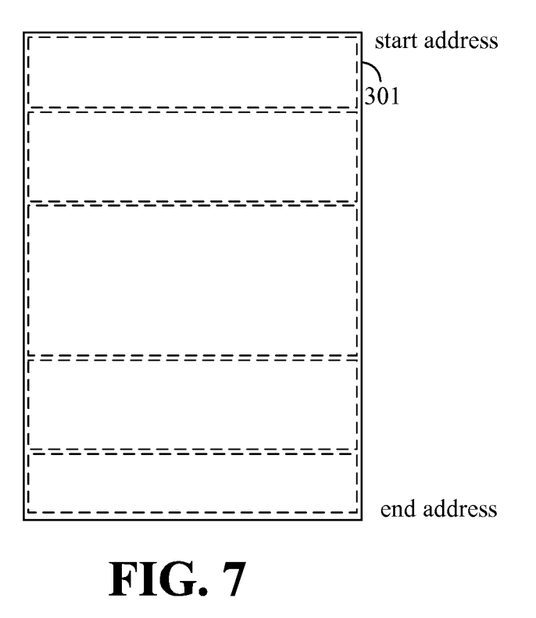
FIG. 7 is the chunk of the memory such as is depicted in FIG. 4 showing the entire chunk entirely mapped with TLB mappings.

After configuration of the first TLB entry covering the smaller portion of physical memory, which is aligned with the start address of the section 301, a second TLB entry is configured. The largest TLB size that allows the boundary of the TLB entry to be aligned with the end of the first TLB entry without extending past the end address of the memory section 301 is selected. The dotted line 600 in FIG. 6 represents the physical memory mapped by the second TLB entry. This process is repeated until the entire memory section 301 is mapped by TLB entries, as shown by FIG. 7. The dotted lines of FIG. 7 represent the areas covered by respective TLB entries that have been configured according to the instant algorithm. As can be seen from FIG. 7, the sizes of the TLB entries begin relatively small at the start address of the memory section 301 and begin to progressively increase. At some point, as the algorithm begins to reach close to the end of the memory section 301, the sizes of the TLB entries begin to get progressively smaller to prevent the TLB entries from overshooting the end address of the memory section 301. Employing the instant algorithm to partition the memory section 301 among TLB entries results in the smallest possible number of TLB entries without wasting any of the addresses in memory.

The instant algorithm for creating TLB entries for insertion into the TLB table to most efficiently use the physical memory during execution can be represented by the following pseudo-code:

```
temp = begin;                                            Line 1
while(temp != end)                                       Line 2
{
    for_each TLB size from largest to smallest           Line 3
    {
        if (temp's alignment = current TLB size alignment) AND    Line 4
        if (end – temp >= 2 times current TLB size) AND           Line 5
        if (temp's alignment is evenly aligned)                   Line 6
        {
            use TLB with current size;                            Line 7
            temp – temp + 2 times current TLB size;               Line 8
            break out of for_each loop;                           Line 9
        }
    }
}
```

Figure 8:
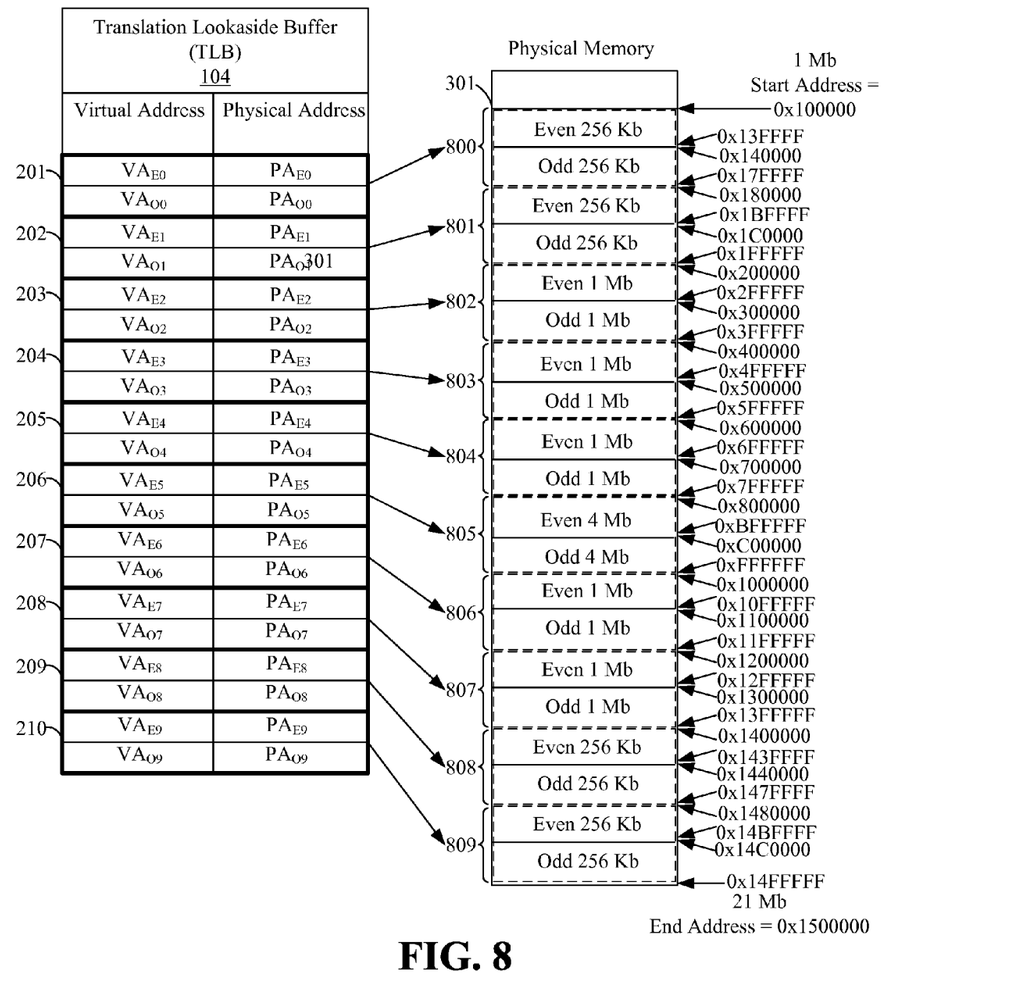
FIG. 8 is a block diagram depicted an exemplary TLB and its relation to the memory section such as is depicted in FIG. 3.

An example is now provided with reference to FIG. 8 for creating TLB entries using the instant algorithm for the instruction data section 301 in accordance with an embodiment of the present disclosure. Notably, the instant algorithm is for creating a plurality of TLB entries 201-210 to cover the physical memory instruction data section 301. In the example provided, the start address of the section 301 is at 1 MB, and the ending address is at 21 MB.

In Line 1 the algorithm assigns a temporary pointer (temp) to the beginning address (begin) of the instruction data section 301, which is 1 MB. In Line 2, while the temporary pointer is not the end address, which is at 21 MB, the algorithm performs the "for_each" loop in Line 3 for each of the available TLB sizes (i.e., TLB size) for the TLB entry. As described hereinabove, the available sizes for the TLB entry in the instant example include 16 MB, 4 MB, 1 MB, 256 KB, 64 KB, 16 KB, and 4 KB. Thus, for each of these sizes and until a suitable TLB size is found, the algorithm performs the "for_each" loop.

In Line 4, the algorithm determines alignment of the current TLB size, which at this point is 16 MB, with the temporary pointer, which is the 1 MB address. Because 1 MB is not an integer multiple of 16 MB, the temporary pointer (i.e., 1 MB) is not aligned with the 16 MB size. Thus, the logical "if" statement in Line 4 resolves to false. Therefore, the algorithm breaks out of the for_each loop and decrements to the next largest "TLB size," which is 4 MB.

In Line 4, the algorithm determines alignment of the current TLB size, which is at this point 4 MB, with the temporary pointer, which is at this point 1 MB. Because 1 MB is not an integer multiple of 4 MB, the temporary pointer (i.e., 1 MB) is not aligned with the 4 MB size. Thus, the logical "if" statement in Line 4 resolves to false. Therefore, the algorithm breaks out of the for_each loop and decrements to the next largest "TLB size," which is 1 MB.

In Line 4, the algorithm determines alignment of the current TLB size, which at this point is 1 MB, with the temporary pointer, which is the 1 MB address. Because 1 MB is an integer multiple of 1 MB (i.e., 1 MB times 1 equals 1 MB), the address pointed to by the temporary point (i.e., 1 MB) is aligned with the 1 MB TLB size. Thus, the logical "if" statement in Line 4 resolves to true. Therefore, the algorithm continues to Line 5.

In Line 5, the algorithm determines the difference between the end address of the section 301 and the temporary pointer, and if such difference is greater than or equal to twice the current TLB size, then the logical "if" statement returns a true indication. In this regard, the algorithm determines whether a range of the TLB size will fit within the section 301. Note that the comparison of the difference to twice the TLB size is to account for the physical memory allocated to both the even page and the odd page of the TLB entry, i.e., the even page is allocated to a certain size, and the odd page is allocated to the same size, which makes the total physical memory allocated to the TLB entry two times the size.

Continuing with the example, the current temporary pointer is 1 MB, and the end pointer is at 21 MB. In Line 5, the difference between the temporary pointer and the end pointer is 20 MB and the current TLB size is 1 MB. In this regard, 20 MB is greater than or equal to two times the current TLB size (i.e., 2 MB). Therefore, the logical "if" statement on Line 5 resolves to true.

Next, the algorithm resolves the logical "if" statement on Line 6. In this regard, the algorithm determines whether the address pointed to by the temporary pointer is evenly aligned with the TLB size. Note that in order to determine whether the temporary pointer and the current TLB size are evenly aligned, the algorithm determines if the temporary pointer bitwise OR-ed with the inverse of the TLB size is equal to the inverse of the TLB size. If so, then the temporary pointer has even alignment with the current TLB size. This can be expressed by the following logical statement:

if((temporary pointer|~TLB size)==~TLB size)

then there is even alignment between the temporary pointer and the current TLB size. In the example provided, the temporary pointer is 1 MB, and the current TLB size is 1 MB. As described hereinabove, the 1 MB temporary pointer and the 1 MB TLB size are aligned. However, they are not evenly aligned, because the temporary pointer OR-ed with the inverse of the TLB size is not equal to the inverse of the TLB size.

Because the 1 MB temporary pointer and the 1 MB TLB size are not evenly aligned, the logical "if" statement on Line 6 resolves to false. Therefore, the algorithm breaks out of the for_each loop and decrements to the next largest "TLB size," which is 256 KB.

In Line 4, the algorithm determines alignment for the current TLB size, which at this point is 256 KB, with the temporary pointer, which is the 1 MB address. Because 1 MB is an integer multiple of 256 KB (i.e., 256 KB times 4 is equal to 1 MB), the address pointed to by the temporary pointer (i.e., 1 MB) is aligned with the 256 KB TLB size. Thus, the logical "if" statement in Line 4 resolves to true. Therefore, the algorithm continues to Line 5.

In Line 5, the algorithm determines the difference between the end address of the section 301 and the temporary pointer. If such difference is greater than or equal to twice the current TLB size, then the logical "if" statement resolves to true. Continuing with the example, the current address pointed to by the temporary pointer is 1 MB, and the end pointer is 21 MB. In Line 5, the difference between the temporary pointer and the end pointer is 20 MB and the current TLB size is 256 KB. In this regard, 20 MB is greater than or equal to two times the current TLB size (i.e., 512 KB). Therefore, the logical "if" statement on Line 5 resolves to true.

Next, the algorithm resolves the logical "if" statement on Line 6. In this regard, the algorithm determines whether the temporary pointer is evenly aligned with the current TLB size, as described hereinabove. In the instant example, the temporary pointer (1 MB) OR-ed with the inverse of the TLB size (256 KB) is equal to the inverse of the TLB size. Thus, the logical "if" statement on Line 6 resolves to true, and the algorithm continues on to Line 7.

In light of the foregoing, each of the "if" statements in Lines 4, 5, and 6 resolve to true. Thus, the logical AND statements resolve to true, and the algorithm continues at Line 7. At Line 7, a TLB entry is created using the current TLB size, which is 256 KB. With reference to FIG. 8, the TLB entry 201 would cover 512 KB, which would include 256 KB covered by the even page of the TLB entry 201 and 256 KB covered by the odd page of the TLB entry 201, thereby covering a physical memory section 800. The physical address ranges covering the physical memory would be 0x100000-0x13FFFF (where 0x13FFFF is equal to 1 MB plus 256 KB minus 1) for the even page and 0x140000-0x17FFFF (where 0x17FFFF is equal to 1.25 MB plus 256 KB minus 1) for the odd page.

In Line 8, the algorithm sets the temporary pointer equal to the sum of the current temporary pointer, which is at 1 MB, and twice the current TLB size, which is 512 KB. Therefore, the temporary pointer now points to 1.5 MB. The algorithm then breaks out of the "for_each" loop in Line 9, and the algorithm begins again at the "while" statement in Line 2.

In Line 2, while the temporary pointer is not the end pointer, the algorithm performs the "for_each" loop in Line 3 for each of the available sizes (i.e., TLB size) for the TLB entry, as described hereinabove. Starting with the largest TLB size, 16 MB, in Line 4 the algorithm resolves the "if" statement by determining alignment for the current TLB size, which at this point is 16 MB, with the temporary pointer, which is the 1.5 MB address. In this regard, the 1.5 MB is not an integer multiple of 16 MB, therefore the 1.5 MB is not aligned with the 16 MB, and the "if" statement resolves to false. Therefore, the algorithm continues at Line 3 with the next largest TLB size, which is 4 MB.

The algorithm continues at Line 4 by resolving the "if" statement by determining alignment for the current TLB size, which at this point is 4 MB, with the temporary pointer, which is the 1.5 MB address. Because 1.5 MB is not an integer multiple of the 4 MB, then the temporary pointer is not aligned with the TLB size, and the "if" statement resolves to false. Therefore, the algorithm continues at Line 3 with the next largest TLB size, which is 1 MB.

The algorithm continues at Line 4 by resolving the "if" statement by the algorithm determines alignment for the current TLB size, which at this point is 1 MB, with the temporary pointer, which is the 1.5 MB address. Because 1.5 MB is not an integer multiple of the 1 MB, then the temporary pointer is not aligned with the TLB size, and the "if" statement resolves to false. Therefore, the algorithm continues at Line 3 with the next largest TLB size, which is 256 KB.

The algorithm continues at Line 4 by resolving the "if" statement by determining alignment for the current TLB size, which at this point is 256 KB, with the temporary pointer, which is the 1.5 MB address. Because 1.5 MB is an integer multiple of the 256 KB (i.e., 256 KB times 6 equals 1.5 MB), then the temporary pointer is aligned with the TLB size, and the "if" statement resolves to true. Therefore, the algorithm continues at Line 5 with the next "if" statement.

In Line 5, the algorithm determines the difference between the end address of the section 301 and the temporary pointer, and if such difference is greater than or equal to twice the current TLB size, then the logical "if" statement returns a true indication. Continuing with the example, the current temporary pointer is 1.5 MB and the end pointer is 21 MB. The difference between the temporary pointer and the end pointer is 19.5 MB and the current TLB size is 256 KB. In this regard, 19.5 MB is greater than or equal to two times the current TLB size (i.e., 512 KB). Therefore, the logical "if" statement on Line 5 resolves to true.

Next, the algorithm resolves the logical "if" statement on Line 6. In this regard, the algorithm determines whether the temporary pointer is evenly aligned with the current TLB size. Such method of determining even alignment is described hereinabove. In this regard, the temporary pointer OR-ed with the inverse of the current TLB size is equal to the inverse of the TLB size. Therefore, the temporary pointer is evenly aligned with the current TLB size, and the "if" statement on Line 6 resolves to true.

In light of the foregoing, each of the "if" statements in Lines 4, 5, and 6 resolve to true. Thus, the logical AND statements resolve to true, and the algorithm continues at Line 7. At Line 7, a TLB entry is created using the current TLB size, which is 256 KB. With reference to FIG. 8, the TLB entry 202 would cover 512 KB, which would include 256 KB covered by the even page of the TLB entry 202 and 256 KB covered by the odd page of the TLB entry 202, thereby covering a physical memory section 801. The physical address ranges covering the physical memory section 801 are 0x180000-0x1BFFFF (where 0x1BFFFF is equal to 1.5 MB plus 256 KB minus 1) for the even page and 0x1C0000-0x1FFFFF (where 0x1FFFFF is equal to 1.75 MB plus 256 KB minus 1) for the odd page.

In Line 8, the algorithm sets the temporary pointer equal to the sum of the current temporary pointer, which is at 1.5 MB, and twice the current TLB size, which is 512 KB. Therefore, the temporary pointer now points to 2 MB. The algorithm then breaks out of the "for_each" loop in Line 9, and the algorithm begins again at the "while" statement in Line 2.

In Line 2, while the temporary pointer is not the end address, the algorithm performs the "for_each" loop in Line 3 for each of the available sizes (i.e., TLB size) for the TLB entry, as described hereinabove. Starting with the largest TLB size, 16 MB, in Line 4 the algorithm resolves the "if" statement by determining alignment for the current TLB size, which at this point is 16 MB, with the temporary pointer, which is the 2 MB address.

Because 2 MB is not an integer multiple of 16 MB, then the temporary pointer is not aligned with the current TLB size. Thus, the algorithm continues at Line 3 with the next largest TLB size, which is 4 MB. Because 2 MB is not an integer multiple of 4 MB, then the temporary pointer is not aligned with the current TLB size, which is 4 MB. Thus, the algorithm continues at Line 3 with the next largest TLB size, which is 1 MB. Because 2 MB is an integer multiple of 1 MB (i.e., 1 MB times 2 equals 2 MB), then the temporary pointer is aligned with the current TLB size of 1 MB. Thus, the "if" statement on Line 4 resolves to true.

The algorithm continues by resolving the "if" statement on Line 5. Continuing with the example, the current address pointed to by the temporary pointer is 2 MB and the end pointer is 21 MB. The difference between the temporary pointer and the end pointer is 19 MB and the current TLB size is 1 MB. Because 19 MB is greater than or equal to two times the current TLB size (i.e., 2 MB), the logical "if" statement on Line 5 resolves to true.

Next, the algorithm resolves the logical "if" statement on Line 6. In the example provided, the temporary pointer is 2 MB, and the current TLB size is 1 MB. The temporary pointer OR-ed with the inverse of the current TLB size is equal to the inverse of the current TLB size. Therefore, the logical "if" statement on Line 6 resolves to true, which means that all three logical "if" statements on Lines 4, 5, and 6 resolve to true for the 1 MB TLB size and the 2 MB temporary pointer. Thus, the logical "AND" statements resolve to true, and the algorithm continues on to Line 7.

At Line 7, a TLB entry is created using the current TLB size, which is 1 MB. With reference to FIG. 8, the TLB entry 203 would cover 2 MB physical memory, which would include 1 MB covered by the even page of the TLB entry 203 and 1 MB covered by the odd page of the TLB entry 203, thereby covering a physical memory section 802. The physical address ranges covering the physical memory would be 0x200000-0x2FFFFF (where 0x2FFFFF is equal to 2 MB plus 1 MB minus 1) for the even page and 0x300000-0x3FFFFF (where 0x3FFFFF is equal to 3 MB plus 1 MB minus 1) for the odd page.

In Line 8, the algorithm sets the temporary pointer equal to the sum of the current temporary pointer, which is 2 MB, and twice the current TLB size, which is 2 MB. Therefore, the temporary pointer now points to 4 MB. The algorithm then breaks out of the "for_each" loop in Line 9, and the algorithm begins again at the "while" statement in Line 2.

In Line 2, while the temporary pointer is not the end pointer, the algorithm performs the "for_each" loop in Line 3 for each of the available sizes (i.e., TLB size) for the TLB entry, as described hereinabove. Starting with the largest TLB size, 16 MB, in Line 4 the algorithm resolves the "if" statement by determining alignment for the current TLB size, which at this point is 16 MB, with the temporary pointer, which is the 4 MB address. In this regard, 4 MB is not an integer multiple of 16 MB, therefore the 4 MB is not aligned with the 16 MB, and the "if" statement resolves to false. Therefore, the algorithm continues at Line 3 with the next largest TLB size, which is 4 MB.

The algorithm continues at Line 4 by resolving the "if" statement by determining alignment for the current TLB size, which at this point is 4 MB, with the temporary pointer, which is the 4 MB address. Because 4 MB is an integer multiple of the 4 MB temporary pointer (i.e., 4 MB times 1 is equal to 4 MB), then the temporary pointer is aligned with the TLB size, and the "if" statement resolves to true.

Next, the algorithm resolves the "if" statement in Line 5. In this regard, the algorithm determines if the current TLB size can fit within the remaining physical memory of section 301. In this regard, the difference in the end pointer at 21 MB and the temporary pointer at 4 MB is 17 MB. In this regard, 17 MB is greater than or equal to two times the current TLB size (i.e., 8 MB). Therefore, the "if" statement on Line 5 resolves to true. Therefore, the algorithm continues on to Line 6.

At Line 6, the algorithm resolves the "if" statement by determining whether the temporary pointer is evenly aligned with the current TLB size. In the example, the temporary pointer (4 MB) OR-ed with the inverse of the current TLB size (4 MB) is not equal to the inverse of the current TLB size. Therefore, the logical "if" statement resolves to false, and the algorithm breaks out of the for_each loop and decrements to the next largest TLB size, which is 1 MB at Line 3.

The algorithm continues at Line 4 by resolving the "if" statement by determining alignment for the current TLB size, which at this point is 1 MB, with the temporary pointer, which is the 4 MB address. Because 4 MB is an integer multiple of the temporary pointer of 1 MB (i.e., 1 MB times 4 equals 4 MB), then the temporary pointer is aligned with the TLB size, and the "if" statement resolves to true. Therefore, the algorithm continues at Line 5 with the next "if" statement.

In Line 5, the algorithm determines the difference between the end address of the section 301 and the temporary pointer, and if such difference is greater than or equal to twice the current TLB size, then the logical "if" statement returns a true indication. Continuing with the example, the current temporary pointer is 4 MB and the end pointer is 21 MB. The difference between the temporary pointer and the end pointer is 17 MB and the current TLB size is 1 MB. In this regard, 17 MB is greater than two times the current TLB size (i.e., 2 MB). Therefore, the logical "if" statement on Line 5 resolves to true.

Next, the algorithm resolves the logical "if" statement on Line 6. In this regard, the algorithm determines whether the temporary pointer is evenly aligned with the current TLB size. Such method of determining even alignment is described hereinabove. In this regard, the temporary pointer OR-ed with the inverse of the current TLB size is equal to the inverse of the TLB size. Therefore, the temporary pointer (4 MB) is evenly aligned with the current TLB size (1 MB), and the "if" statement resolves to true.

In light of the foregoing, each of the "if" statements in Lines 4, 5, and 6 resolve to true. Thus, the logical AND statements resolve to true, and the algorithm continues at Line 7. At Line 7, a TLB entry is created using the current TLB size, which is 1 MB. With reference to FIG. 8, the TLB entry 204 would cover 2 MB of physical memory, which would include 1 MB covered by the even page of the TLB entry 204 and 1 MB covered by the odd page of the TLB entry 204, thereby covering a physical memory section 803. The physical address ranges covering the physical memory section 803 are 0x400000-0x4FFFFF (where 0x4FFFFF is equal to 4 MB plus 1 MB minus 1) for the even page and 0x500000-0x5FFFFF (where 0x5FFFFF is equal to 5 MB plus 1 MB minus 1) for the odd page.

In Line 8, the algorithm sets the temporary pointer equal to the sum of the current temporary pointer, which is at 4 MB, and twice the current TLB size, which is 2 MB. Therefore, the temporary pointer now points to 6 MB. The algorithm then breaks out of the "for_each" loop in Line 9, and the algorithm begins again at the "while" statement in Line 2.

In Line 2, while the temporary pointer is not the end address, the algorithm performs the "for_each" loop in Line 3 for each of the available sizes (i.e., TLB size) for the TLB entry, as described hereinabove. Starting with the largest TLB size, 16 MB, in Line 4 the algorithm resolves the "if" statement by determining alignment for the current TLB size, which at this point is 16 MB, with the temporary pointer, which is the 6 MB address.

Because 6 MB is not an integer multiple of 16 MB, then the temporary pointer is not aligned with the current TLB size. Thus, the algorithm continues at Line 3 with the next largest TLB size, which is 4 MB. Because 6 MB is not an integer multiple of 4 MB, then the temporary pointer is not aligned with the current TLB size. Thus, the algorithm continues at Line 3 with the next largest TLB size, which is 1 MB. Because 6 MB is an integer multiple of 1 MB (i.e., 1 MB times 6 equals 6 MB), then the temporary pointer is aligned with the current TLB size of 1 MB. Thus, the "if" statement on Line 4 resolves to true.

The algorithm continues by resolving the "if" statement on Line 5. Continuing with the example, the current address pointed to by the temporary pointer is 6 MB and the end pointer is 21 MB. The difference between the temporary pointer and the end pointer is 15 MB and the current TLB size is 1 MB. Because 15 MB is greater than two times the current TLB size (i.e., 2 MB), the logical "if" statement on Line 5 resolves to true.

Next, the algorithm resolves the logical "if" statement on Line 6. In the example provided, the temporary pointer is 6 MB, and the current TLB size is 1 MB. The temporary pointer OR-ed with the inverse of the current TLB size is equal to the inverse of the current TLB size. Therefore, the logical "if" statement on Line 6 resolves to true, which means that all three logical "if" statements on Lines 4, 5, and 6 resolve to true for the 1 MB TLB size and the 6 MB temporary pointer. Thus, the logical "AND" statements resolve to true, and the algorithm continues on to Line 7.

At Line 7, a TLB entry is created using the current TLB size, which is 1 MB. With reference to FIG. 8, the TLB entry 205 would cover 2 MB physical memory, which would include 1 MB covered by the even page of the TLB entry 205 and 1 MB covered by the odd page of the TLB entry 205, thereby covering a physical memory section 804. The physical address ranges covering the physical memory would be 0x600000-0x6FFFFF (where 0x6FFFFF is equal to 6 MB plus 1 MB minus 1) for the even page and 0x700000-0x7FFFFF (where 0x7FFFFF is equal to 7 MB plus 1 MB minus 1) for the odd page.

In Line 8, the algorithm sets the temporary pointer equal to the sum of the current temporary pointer, which is 6 MB, and twice the current TLB size, which is 2 MB. Therefore, the temporary pointer now points to 8 MB. The algorithm then breaks out of the "for_each" loop in Line 9, and the algorithm begins again at the "while" statement in Line 2.

In Line 2, while the temporary pointer is not the end address, the algorithm performs the "for_each" loop in Line 3 for each of the available sizes (i.e., TLB size) for the TLB entry, as described hereinabove. Starting with the largest TLB size, 16 MB, in Line 4 the algorithm resolves the "if" statement by determining alignment for the current TLB size, which at this point is 16 MB, with the temporary pointer, which is the 8 MB address.

Because 8 MB is not an integer multiple of 16 MB, then the temporary pointer is not aligned with the current TLB size. Thus, the algorithm continues at Line 3 with the next largest TLB size, which is 4 MB. Because 8 MB is an integer multiple of 4 MB, then the temporary pointer is aligned with the current TLB size, which at this point is 4 MB. Thus, the "if" statement on Line 4 resolves to true.

The algorithm continues by resolving the "if" statement on Line 5. Continuing with the example, the temporary pointer is 8 MB and the end pointer is 21 MB. The difference between the temporary pointer and the end pointer is 13 MB and the current TLB size is 4 MB. Because 13 MB is greater than two times the current TLB size (i.e., 8 MB), the logical "if" statement on Line 5 resolves to true.

Next, the algorithm resolves the logical "if" statement on Line 6. In the example provided, the temporary pointer is 8 MB, and the current TLB size is 4 MB. The temporary pointer OR-ed with the inverse of the current TLB size is equal to the inverse of the current TLB size. Therefore, the logical "if" statement on Line 6 resolves to true, which means that all three logical "if" statements on Lines 4, 5, and 6 resolve to true for the 4 MB TLB size and the 8 MB temporary pointer. Thus, the logical "AND" statements resolve to true, and the algorithm continues on to Line 7.

At Line 7, a TLB entry is created using the current TLB size, which is 4 MB. With reference to FIG. 8, the TLB entry

206 would cover 8 MB physical memory, which would include 4 MB covered by the even page of the TLB entry 206 and 4 MB covered by the odd page of the TLB entry 206, thereby covering a physical memory section 805. The physical address ranges covering the physical memory would be 0x800000-0xBFFFFF (where 0xBFFFFF is equal to 8 MB plus 4 MB minus 1) for the even page and 0xC00000-0xFFFFFF (where 0xFFFFFF is equal to 12 MB plus 4 MB minus 1) for the odd page.

In Line 8, the algorithm sets the temporary pointer equal to the sum of the current temporary pointer, which is 8 MB, and twice the current TLB size, which is 8 MB. Therefore, the temporary pointer now points to 16 MB. The algorithm then breaks out of the "for_each" loop in Line 9, and the algorithm begins again at the "while" statement in Line 2.

In Line 2, while the temporary pointer is not the end address, the algorithm performs the "for_each" loop in Line 3 for each of the available sizes (i.e., TLB size) for the TLB entry, as described hereinabove. Starting with the largest TLB size, 16 MB, in Line 4 the algorithm resolves the "if" statement by determining alignment for the current TLB size, which at this point is 16 MB, with the temporary pointer, which is the 16 MB address.

Because 16 MB is an integer multiple of 16 MB (i.e., 16 MB times 1 equals 16 MB), then the temporary pointer is aligned with the current TLB size. Thus, the "if" statement on Line 4 resolves to true.

The algorithm continues by resolving the "if" statement on Line 5. Continuing with the example, the temporary pointer is 16 MB and the end pointer is 21 MB. The difference between the temporary pointer and the end pointer is 5 MB and the current TLB size is 16 MB. Because 5 MB is not greater than or equal to two times the current TLB size (i.e., 16 MB)MB, the logical "if" statement on Line 5 resolves to false. Thus, the AND statements on Lines 4-6 resolve to false, and the algorithm begins again at Line 3 with the next largest TLB size, which is 4 MB.

At Line 4 the algorithm resolves the "if" statement by determining alignment for the current TLB size, which at this point is 4 MB, with the temporary pointer, which is the 16 MB address. Because 16 MB is an integer multiple of 4 MB (i.e., 4 MB times 4 equals 16 MB), then the temporary pointer is aligned with the current TLB size, which at this point is 4 MB.

The algorithm continues by resolving the "if" statement on Line 5. Continuing with the example, the current address pointed to by the temporary pointer is 16 MB and the end pointer is 21 MB. The difference between the temporary pointer and the end pointer is 5 MB and the current TLB size is 4 MB. Because 5 MB is not greater than or equal to two times the current TLB size (i.e., 8 MB), the logical "if" statement on Line 5 resolves to false. Thus, the algorithm continues at Line 3 with the next largest TLB size, which is 1 MB.

At Line 4 the algorithm resolves the "if" statement by determining alignment for the current TLB size, which at this point is 1 MB, with the temporary pointer, which is the 16 MB address. Because 16 MB is an integer multiple of 1 MB (i.e., 1 MB times 16 equals 16 MB), then the temporary pointer is aligned with the current TLB size, which at this point is 1 MB.

The algorithm continues by resolving the "if" statement on Line 5. Continuing with the example, the current address pointed to by the temporary pointer is 16 MB and the end pointer is 21 MB. The difference between the temporary pointer and the end pointer is 5 MB and the current TLB size is 1 MB. Because 5 MB is greater than or equal to two times the current TLB size (i.e., 2 MB), the logical "if" statement on Line 5 resolves to true.

Next, the algorithm resolves the logical "if" statement on Line 6. In the example provided, the temporary pointer is 16 MB, and the current TLB size is 1 MB. The temporary pointer OR-ed with the inverse of the current TLB size is equal to the inverse of the current TLB size. Therefore, the logical "if" statement on Line 6 resolves to true, which means that all three logical "if" statements on Lines 4, 5, and 6 resolve to true for the 1 MB TLB size and the 16 MB temporary pointer. Thus, the logical "AND" statements resolve to true, and the algorithm continues on to Line 7.

At Line 7, a TLB entry is created using the current TLB size, which is 1 MB. With reference to FIG. 8, the TLB entry 207 would cover 2 MB physical memory, which would include 1 MB covered by the even page of the TLB entry 207 and 1 MB covered by the odd page of the TLB entry 207, thereby covering a physical memory section 806. The physical address ranges covering the physical memory would be 0x1000000-0x10FFFFF (where 0x10FFFFF is equal to 16 MB plus 1 MB minus 1) for the even page and 0x1100000-0x11FFFFF (where 0x11FFFFF is equal to 17 MB plus 1 MB minus 1) for the odd page.

In Line 8, the algorithm sets the temporary pointer equal to the sum of the current temporary pointer, which is 16 MB, and twice the current TLB size, which is 2 MB. Therefore, the temporary pointer now points to 18 MB. The algorithm then breaks out of the "for_each" loop in Line 9, and the algorithm begins again at the "while" statement in Line 2.

In Line 2, while the temporary pointer is not the end address, the algorithm performs the "for_each" loop in Line 3 for each of the available sizes (i.e., TLB size) for the TLB entry, as described hereinabove. Starting with the largest TLB size, 16 MB, in Line 4 the algorithm resolves the "if" statement by determining alignment for the current TLB size, which at this point is 16 MB, with the temporary pointer, which is the 18 MB address.

Because 18 MB is not an integer multiple of 16 MB, then the temporary pointer is not aligned with the current TLB size. Thus, the "if" statement on Line 4 resolves to true. Thus, the algorithm continues at Line 3 with the next largest TLB size, which is 4 MB. Because 18 MB is not an integer multiple of 4 MB, then the temporary pointer is not aligned with the current TLB size, which is 4 MB. Thus, the algorithm continues at Line 3 with the next largest TLB size, which is 1 MB. Because 18 MB is an integer multiple of 1 MB (i.e., 1 MB times 18 equals 18 MB), then the temporary pointer is aligned with the current TLB size of 1 MB. Thus, the "if" statement on Line 4 resolves to true.

The algorithm continues by resolving the "if" statement on Line 5. In this regard, the end pointer is 21 MB and the temporary pointer is 18 MB. The difference in the end pointer and the temporary pointer is 3 MB. Because 3 MB is greater than two times the current TLB size (2 MB), the "if" statement on Line 5 resolves to true, and the algorithm continues onto Line 6.

Next, the algorithm resolves the logical "if" statement on Line 6. In the example provided, the temporary pointer is 18 MB, and the current TLB size is 1 MB. The temporary pointer OR-ed with the inverse of the current TLB size is equal to the inverse of the current TLB size. Therefore, the logical "if" statement on Line 6 resolves to true, which means that all three logical "if" statements on Lines 4, 5, and 6 resolve to true for the 1 MB TLB size and the 18 MB temporary pointer. Thus, the logical "AND" statements resolve to true, and the algorithm continues on to Line 7.

At Line 7, a TLB entry is created using the current TLB size, which is 1 MB. With reference to FIG. 8, the TLB entry 208 would cover 2 MB physical memory, which would include 1 MB covered by the even page of the TLB entry 208 and 1 MB covered by the odd page of the TLB entry 208, thereby covering a physical memory section 807. The physical address ranges covering the physical memory would be 0x1200000-0x12FFFFF (where 0x12FFFFF is equal to 18 MB plus 1 MB minus 1) for the even page and 0x1300000-0x13FFFFF (where 0x13FFFFF is equal to 19 MB plus 1 MB minus 1) for the odd page.

In Line 8, the algorithm sets the temporary pointer equal to the sum of the current temporary pointer, which is 18 MB, and twice the current TLB size, which is 2 MB. Therefore, the temporary pointer now points to 20 MB. The algorithm then breaks out of the "for_each" loop in Line 9, and the algorithm begins again at the "while" statement in Line 2.

In Line 2, while the temporary pointer is not the end address, the algorithm performs the "for_each" loop in Line 3 for each of the available sizes (i.e., TLB size) for the TLB entry, as described hereinabove. Starting with the largest TLB size, 16 MB, in Line 4 the algorithm resolves the "if" statement by determining alignment for the current TLB size, which at this point is 16 MB, with the temporary pointer, which is the 20 MB address.

Because 20 MB is not an integer multiple of 16 MB, then the temporary pointer is not aligned with the current TLB size. Thus, the "if" statement on Line 4 resolves to false. The algorithm begins the "for_each" loop again with the next largest TLB size, which would be 4 MB.

In Line 4 the algorithm resolves the "if" statement by determining alignment for the current TLB size, which at this point is 4 MB, with the temporary pointer, which is the 20 MB address. Because 20 MB is an integer multiple of 4 MB (i.e., 4 MB times 5 equals 20 MB), then the temporary pointer is aligned with the current TLB size. Thus, the "if" statement on Line 4 resolves to true.

The algorithm continues by resolving the "if" statement on Line 5. In this regard, the end pointer is 21 MB and the temporary pointer is 20 MB. The difference in the end pointer and the temporary pointer is 1 MB. Because 1 MB is not greater than or equal to two times the current TLB size (i.e., 8 MB), the "if" statement on Line 5 resolves to false, and the algorithm begins the "for_each" loop again with the next largest TLB size, which is 1 MB.

In Line 4 the algorithm resolves the "if" statement by determining alignment for the current TLB size, which at this point is 1 MB, with the temporary pointer, which is the 20 MB address. Because 20 MB is a multiple of 1 MB (i.e., 1 MB times 20 equals 20 MB), then the temporary pointer is aligned with the current TLB size. Thus, the "if" statement on Line 4 resolves to true.

The algorithm continues by resolving the "if" statement on Line 5. In this regard, the end pointer is 21 MB and the temporary pointer is 20 MB. The difference in the end pointer and the temporary pointer is 1 MB. Because 1 MB is not greater than or equal to two times the current TLB size (i.e., 2 MB), the "if" statement on Line 5 resolves to false, and the algorithm begins the "for_each" loop again with the next largest TLB size, which is 256 KB.

In Line 4 the algorithm resolves the "if" statement by determining whether the temporary pointer, 20 MB, is aligned with the current TLB size, 256 MB. Because 20 MB is an integer multiple of 256 KB (i.e., 256 KB times 80 equals 20 MB), then the temporary pointer is aligned with the current TLB size. Thus, the "if" statement on Line 4 resolves to true.

The algorithm continues by resolving the "if" statement on Line 5. In this regard, the end pointer is 21 MB and the temporary pointer is 20 MB. The difference in the end pointer and the temporary pointer is 1 MB. Because 1 MB is greater than or equal to two times the current TLB size (i.e., 512 KB), the "if" statement on Line 5 resolves to true.

Next, the algorithm resolves the logical "if" statement on Line 6. In the example provided, the temporary pointer is 20 MB, and the current TLB size is 256 KB. The temporary pointer OR-ed with the inverse of the current TLB size is equal to the inverse of the current TLB size. Therefore, the logical "if" statement on Line 6 resolves to true, which means that all three logical "if" statements on Lines 4, 5, and 6 resolve to true for the 256 KB TLB size and the 20 MB temporary pointer. Thus, the logical "AND" statements resolve to true, and the algorithm continues on to Line 7.

At Line 7, a TLB entry is created using the current TLB size, which is 256 KB. With reference to FIG. 8, the TLB entry 209 would cover 512 KB physical memory, which would include 256 KB covered by the even page of the TLB entry 209 and 256 KB covered by the odd page of the TLB entry 209, thereby covering a physical memory section 808. The physical address ranges covering the physical memory section 808 are 0x1400000-0x143FFFF (where 0x143FFFF is equal to 20 MB plus 256 KB minus 1) for the even page and 0x1440000-0x147FFFF (where 0x147FFFF is equal to 20.25 MB plus 256 KB minus 1) for the odd page.

In Line 8, the algorithm sets the temporary pointer equal to the sum of the current temporary pointer, which is 20 MB, and twice the current TLB size, which is 512 KB. Therefore, the temporary pointer now points to 20.5 MB. The algorithm then breaks out of the "for_each" loop in Line 9, and the algorithm begins again at the "while" statement in Line 2.

In Line 2, while the temporary pointer is not the end address, the algorithm performs the "for_each" loop in Line 3 for each of the available sizes (i.e., TLB size) for the TLB entry, as described hereinabove. Starting with the largest TLB size, 16 MB, in Line 4 the algorithm resolves the "if" statement by determining alignment for the current TLB size, which at this point is 16 MB, with the temporary pointer, which is the 20.5 MB address.

Because 20.5 MB is not an integer multiple of 16 MB, then the temporary pointer is not aligned with the current TLB size. Thus, the "if" statement on Line 4 resolves to false. The algorithm begins the "for_each" loop again with the next largest TLB size, which would be 4 MB.

In Line 4 the algorithm resolves the "if" statement by determining alignment for the current TLB size, which at this point is 4 MB, with the temporary pointer, which is the 20.5 MB address. Because 20.5 MB is not an integer multiple of 4 MB, then the temporary pointer is not aligned with the current TLB size. Thus, the "if" statement on Line 4 resolves to false, and the algorithm begins with the "for_each" loop again with the next largest TLB size, which is 1 MB.

In Line 4 the algorithm resolves the "if" statement by determining alignment for the current TLB size, which at this point is 1 MB, with the temporary pointer, which is the 20.5 MB address. Because 20.5 MB is not an integer multiple of 1 MB, then the temporary pointer is not aligned with the current TLB size. Thus, the "if" statement on Line 4 resolves to false, and the algorithm begins with the "for_each" loop again with the next largest TLB size, which is 256 KB.

In Line 4 the algorithm resolves the "if" statement by determining alignment for the current TLB size, which at this point is 256 KB, with the temporary pointer, which is the 20.5 MB address. Because 20.5 MB is an integer multiple of 256 KB (i.e., 256 KB times 82 equals 20.5 MB), then the temporary pointer is aligned with the current TLB size. Thus, the "if" statement on Line 4 resolves to true.

The algorithm continues by resolving the "if" statement on Line 5. In this regard, the end pointer is 21 MB and the temporary pointer is 20.5 MB. The difference in the end pointer and the temporary pointer is 512 KB. Because 512 KB is greater than or equal to two times the current TLB size (i.e., 512 KB), the "if" statement on Line 5 resolves to true.

Next, the algorithm resolves the logical "if" statement on Line 6. In the example provided, the temporary pointer is 20.5 MB, and the current TLB size is 256 KB. The temporary pointer OR-ed with the inverse of the current TLB size is equal to the inverse of the current TLB size. Therefore, the logical "if" statement on Line 6 resolves to true, which means that all three logical "if" statements on Lines 4, 5, and 6 resolve to true for the 256 KB TLB size and the 20.5 MB temporary pointer. Thus, the logical "AND" statements resolve to true, and the algorithm continues on to Line 7.

At Line 7, a TLB entry is created using the current TLB size, which is 256 KB. With reference to FIG. 8, the TLB entry 210 would cover 512 KB physical memory, which would include 256 KB covered by the even page of the TLB entry 210 and 256 KB covered by the odd page of the TLB entry 210, thereby covering a physical memory section 809. The physical address ranges covering the physical memory section 809 are 0x1480000-0x14BFFFF (where 0x14BFFFF is equal to 20.5 MB plus 256 KB minus 1) for the even page and 0x14C0000-0x14FFFFF (where 0x14FFFFF is equal to 20.75 MB plus 256 KB minus 1) for the odd page.

Such described process details the entire mapping of the physical memory section 301 with ten (10) TLB entries 201-210. In one embodiment, as the TLB entries 201-210 are inserted into the TLB 104, the algorithm further sets the global bit 212 (FIG. 2) and 221 (FIG. 2) such that the entries 201-210 are static. In this regard, during execution of the executable stored in the physical memory section 301, the TLB entries 201-210 cannot be overwritten in response to a TLB miss.

Figure 9:
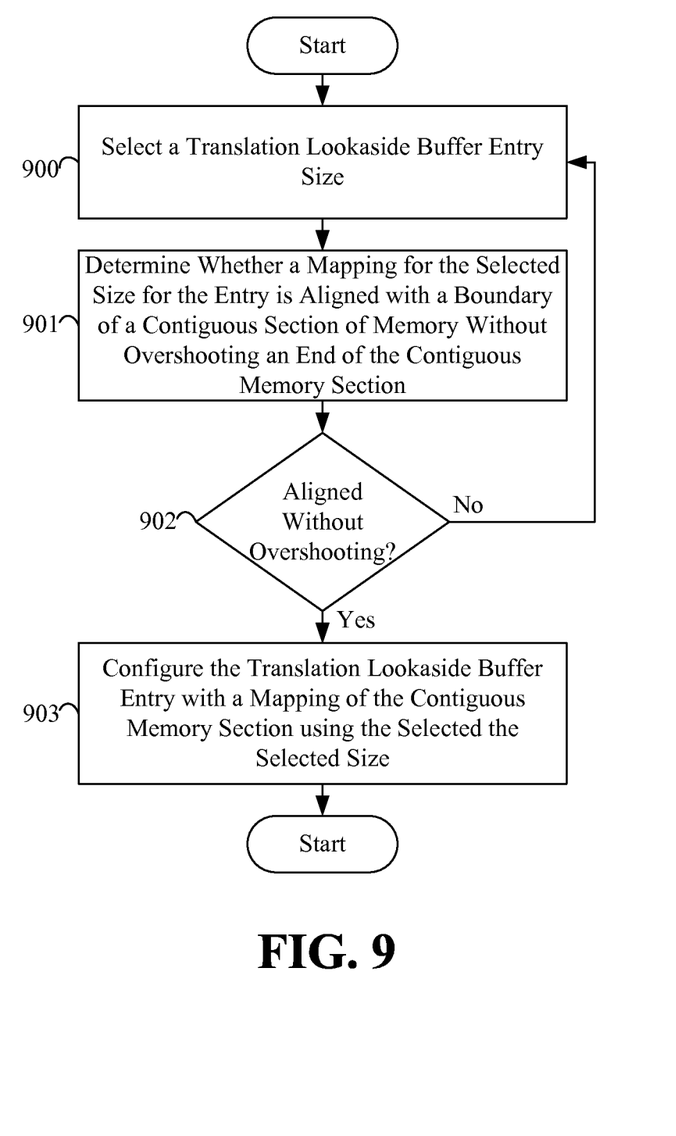
FIG. 9 is a flowchart depicting exemplary architecture and functionality of an algorithm for mapping a chunk of memory with TLB mappings.

FIG. 9 is a flowchart depicting exemplary architecture and functionality of the algorithm described hereinabove. As indicated hereinabove, such logic (not shown) embodying the algorithm may be inserted into the instruction data physical memory section 301 such that upon execution of the executable, the TLB entries 201-210 are inserted into the TLB 104 prior to further execution of the remaining portions of the executable embodied in the instruction data section 301.

In step 900, the algorithm described in Lines 1-9 selects a TLB entry size. Any sizes are possible in various embodiments of the algorithm. However, for the example provided hereinabove, the sizes available for selection include 16 MB, 4 MB, 1 MB, 256 KB, 16 KB, and 4 KB.

In step 901, the algorithm determines whether a mapping for the selected size for the entry is aligned with a boundary of a contiguous section of memory without overshooting an end of the contiguous section of memory. A process of determining alignment is described herein. Notably, any process for determining alignment may be used in other embodiments of the algorithm.

In step 902, if there is not alignment without overshooting the end of the contiguous section of memory, the algorithm selects another TLB entry size. As indicated hereinabove, the selection of the memory size may be from the largest to the smallest TLB entry size.

In step 902, if there is alignment without overshooting the end of the contiguous section of memory, the algorithm configures the TLB entry with a mapping of the contiguous memory section using the selected TLB entry size. Further, when the algorithm configures the TLB entry size, the algorithm may set the global bit 212 (FIG. 2) associated with the TLB entry such that the TLB entry is static and cannot be overwritten in response to a TLB miss.

The invention claimed is:

1. A computer system, comprising:
a translation lookaside buffer (TLB) having a plurality of entries for mapping virtual memory addresses to physical memory addresses; and
logic configured to perform the following steps for a contiguous section of memory:
(a) selecting a size indicator for a TLB entry of the TLB;
(b) determining whether a mapping for the TLB entry is aligned with a boundary of the contiguous section of memory or a boundary for another entry of the TLB previously mapped to the contiguous section of memory without overshooting an end of the contiguous section of memory, wherein the mapping for the TLB entry maps a respective virtual memory address to each physical memory address for a chunk of the memory having a size equal to the size indicator;
(c) if the mapping for the TLB entry is determined to be aligned with the boundary of the contiguous section of memory or the boundary for another entry of the TLB previously mapped to the contiguous section memory without overshooting the end of the contiguous section of memory, configuring the TLB entry by writing the mapping, including the selected size indicator, into the TLB entry; and
(d) repeating steps (a) through (c) until a mapping for the TLB entry is found to be aligned with the boundary of the contiguous section of memory or the boundary for another entry of the TLB previously mapped to the contiguous section memory without overshooting the end of the contiguous section of memory,
wherein the logic is configured to repeat steps (a) through (d) until the contiguous section of memory is entirely mapped to virtual addresses by entries of the TLB.

2. The computer system of claim 1, wherein the logic is further configured to configure the TLB entry to be static.

3. The computer system of claim 1, wherein the logic is further configured to determine whether the mapping for the TLB entry is aligned with the boundary of the contiguous section of memory by determining whether an address associated with the chunk of memory is an integer multiple of the selected size indicator.

4. The computer system of claim 1, wherein the logic is further configured to determine whether the mapping for the TLB entry is evenly aligned with the boundary of the contiguous section of memory by determining whether an address associated with the chunk of memory OR-ed with the inverse of the TLB entry size is equal to the inverse of the selected size indicator.

5. The computer system of claim 4, further comprising a memory management unit (MMU).

6. The computer system of claim 5, wherein the MMU is configured to receive a virtual address from an application running on a central processing unit and look up the virtual address in the TLB entries created in steps (a) through (d).

7. A computer method, comprising:
(a) selecting a size indicator for a TLB entry of a translation lookaside buffer (TLB) having a plurality of entries for mapping virtual memory addresses to physical memory address;
(b) determining whether a mapping for the TLB entry is aligned with a boundary of a contiguous section of memory or a boundary for another entry of the TLB previously mapped to the contiguous section of memory without overshooting an end of the contiguous section of memory, wherein the mapping for the TLB entry maps a respective virtual memory address to each physical memory address for a chunk of the memory having a size equal to the size indicator;

(c) if the mapping for the TLB entry is determined to be aligned with the boundary of the contiguous section of memory or the boundary for another entry of the TLB previously mapped to the contiguous section of memory without overshooting the end of the contiguous section of memory, configuring the TLB entry by writing the mapping, including the selected size indicator, into the TLB entry; and (d) repeating steps (a) through (c) until a mapping is found to be aligned with the boundary of the contiguous section of memory or the boundary for another entry of the TLB previously mapped to the contiguous section of memory without overshooting the end of the contiguous section of memory, (e) repeating steps (a) through (d) until the contiguous section of memory is entirely mapped to virtual addresses by entries of the TLB.

8. The computer method of claim 7, further comprising configuring the TLB entry to be static.

9. The computer method of claim 7, further comprising determining whether the mapping for the TLB entry is aligned with the boundary of the contiguous section of memory by determining whether an address associated with the chunk of memory is an integer multiple of the selected size indicator.

10. The computer method of claim 7, further comprising determining whether the mapping for the TLB entry is evenly aligned with the boundary of the contiguous section of memory by determining whether an address associated with the chunk of memory OR-ed with the inverse of the selected TLB entry size is equal to the inverse of the selected size indicator.

11. The computer method of claim 10, further comprising receiving, by a memory management unit (MMU), a virtual address from an application running on a central processing unit and looking up the virtual address in the TLB entries created in steps (a) through (d).

* * * * *